United States Patent
Kondou et al.

(10) Patent No.: US 10,359,653 B2
(45) Date of Patent: Jul. 23, 2019

(54) THIN-PLATE LN OPTICAL CONTROL DEVICE

(71) Applicant: Sumitomo Osaka Cement Co., Ltd, Tokyo (JP)

(72) Inventors: Katsutoshi Kondou, Tokyo (JP); Kiyotaka Nakano, Tokyo (JP); Eiji Murakami, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 0 days.

(21) Appl. No.: 15/840,602

(22) Filed: Dec. 13, 2017

(65) Prior Publication Data

US 2018/0164612 A1 Jun. 14, 2018

(30) Foreign Application Priority Data

Dec. 14, 2016 (JP) .................................. 2016-241813

(51) Int. Cl.
| | |
|---|---|
| *G02B 6/122* | (2006.01) |
| *G02B 6/13* | (2006.01) |
| *G02B 6/30* | (2006.01) |
| *G02B 6/134* | (2006.01) |
| *G02F 1/03* | (2006.01) |
| *G02F 1/035* | (2006.01) |
| *G02F 1/225* | (2006.01) |

(52) U.S. Cl.
CPC ........... *G02F 1/0316* (2013.01); *G02B 6/122* (2013.01); *G02B 6/13* (2013.01); *G02B 6/1342* (2013.01); *G02B 6/30* (2013.01); *G02F 1/03* (2013.01); *G02F 1/035* (2013.01); *G02F 1/0353* (2013.01); *G02F 1/225* (2013.01); *G02F 1/2257* (2013.01)

(58) Field of Classification Search
CPC .... G02F 1/0316; G02F 1/0353; G02F 1/2257; G02F 1/0107; G02B 6/122; G02B 6/13
See application file for complete search history.

(56) References Cited

U.S. PATENT DOCUMENTS

| | | | | |
|---|---|---|---|---|
| 8,070,368 B1 * | 12/2011 | Moody | ................ | G02B 6/4228 385/3 |
| 8,270,776 B2 * | 9/2012 | Kinpara | ................ | G02B 6/1342 264/1.24 |

FOREIGN PATENT DOCUMENTS

| | | |
|---|---|---|
| JP | H07152007 A | 6/1995 |
| JP | 2010085738 A | 4/2010 |

OTHER PUBLICATIONS

Hiroshi Nagata and Naoki Mitsugi, "Mechanical Reliability of LiNbO3 Optical Modulators Hermetically Sealed in Stainless Steel Packages", Optical Fiber Technology, vol. 2, p. 216-224(1996).

* cited by examiner

*Primary Examiner* — John Bedtelyon
(74) *Attorney, Agent, or Firm* — Greer, Burns & Crain, Ltd.

(57) ABSTRACT

A thin-plate LN optical control device includes: a thin-plate LN optical waveguide element which includes an optical waveguide formed by thermal diffusion of Ti in a substrate made of lithium niobate, and a control electrode that is formed on the substrate and is configured to control a light wave propagating through the optical waveguide, and in which at least a part of the substrate is thinned; and a housing that accommodates the thin-plate LN optical waveguide element in an air-tight sealing manner. Oxygen is contained in a filler gas inside the housing.

4 Claims, 6 Drawing Sheets

THIN-PLATE LN OPTICAL CONTROL DEVICE

CROSS-REFERENCE TO RELATED APPLICATIONS

This application claims the benefit of Japanese Patent Application No. 2016-241813 filed Dec. 14, 2016, the disclosure of which is herein incorporated by reference in its entirety.

BACKGROUND OF THE INVENTION

Field of the Invention

The present invention relates to an LN optical control device including an LN optical waveguide element in which an optical waveguide and a control electrode configured to control a light wave that propagates through the optical waveguide are formed in a substrate that is formed by using lithium niobate (LN), and a housing that accommodates the LN optical waveguide element in an air-tight sealing manner, and particularly to, an LN optical control device (referred to as a thin-plate LN optical control device) that uses the LN optical waveguide element that is thinned.

Description of Related Art

In an optical communication field or an optical measurement field, there is known an optical control device that uses LN having an electro-optic effect capable of realizing high-speed response. As one of LN optical control devices, there is known an LN optical modulator in which an LN optical waveguide element is accommodated in a housing. In the LN optical waveguide element, a Mach-Zehnder type optical waveguide formed by thermal diffusion of titanium (Ti) and a control electrode configured to control a light wave that propagates through the optical waveguide are formed in an LN substrate.

An optical bandwidth as an example of the performance of the LN optical modulator has a trade-off relationship with a drive voltage. As an example of a method of realizing an LN optical modulator having low-drive-voltage performance in a relatively broadbandwidth, there is known a method of thinning an LN substrate in which the optical waveguide is formed or the LN optical waveguide element (refer to Japanese Laid-open Patent Publication No. 2010-85738).

The LN optical waveguide element is fixed to an inner side of the housing by using an adhesive. In addition, an electrical interconnection including the control electrode of the LN optical waveguide element is formed by using a metal. When being left as is in a moisture-containing atmosphere, an adhesive force of an organic material such as the adhesive may deteriorate. In addition, in a case where application of a voltage is performed continuously in the moisture-containing atmosphere, disconnection or short-circuiting due to migration may occur in the electrical interconnection.

In addition, DC drift is known as a phenomenon peculiar to the LN optical modulator. The DC drift is a phenomenon in which a voltage (referred to as "control voltage") at an operation point for driving the LN optical modulator varies with the elapse of DC voltage application time when a DC voltage is continuously applied to a control electrode of the LN optical modulator (refer to Japanese Laid-open Patent Publication No. 7-152007).

To solve a problem related to reliability of the LN optical modulator, the following structure is used. In the structure, an atmosphere inside a housing, in which an LN optical waveguide element is accommodated, is substituted with an inert gas (for example, nitrogen, helium) that does not contain moisture, and the housing is air-tightly sealed to block an atmosphere on an outer side of the housing (refer to Hiroshi NAGATA and Naoki MITSUGI, "Mechanical Reliability of $LiNbO_3$ Optical Modulators Hermetically Sealed in Stainless Steel Packages", OPTICAL FIBER TECHNOLOGY, Volume 2, pages 216 to 224 (1996)).

The present inventors have prepared a thin-plate LN optical modulator in which an LN optical waveguide element (thin-plate LN optical waveguide element) that is thinned is accommodated in a housing having an air-tightly sealed structure in which an atmosphere inside the housing is substituted with an inert gas that does not contain moisture. DC drift of the thin-plate LN optical modulator has been evaluated. From the evaluation, when comparing the DC drift with DC drift of an LN optical modulator that is not thinned, it was confirmed that a DC drift amount (a fluctuation amount of a control voltage after a constant time at predetermined temperature and initial control voltage) increases, a variation in a DC drift amount between samples increases, and reproducibility (reproducibility of the amount and behavior of the DC drift when measuring the DC drift a plurality of times by using the same sample) is low.

In addition, with regard to an LN substrate, a crystal-grown boule is sliced in a thickness of approximately several hundreds of μm to 1 mm, and a surface of the LN substrate is polished to be flat. In a case where the thickness of the LN substrate is several hundred μm, a processing damage formed on the surface of the LN substrate can be removed or recovered by chemicals or by thermal annealing.

However, there is a concern that an LN substrate that is thinned to several tens of μm or less may be broken, and thus the LN substrate is fixed to a reinforcing substrate by using an adhesive. Accordingly, it is not easy to perform the above-described chemical and thermal treatments. In addition, mass productivity is low under mechanical processing conditions in which the processing damage does not occur, and thus an inspection process is necessary.

SUMMARY OF THE INVENTION

An object of the invention is to solve a problem related to an increase in a DC drift amount, a great variation between samples, and low reproducibility which occur in a thin-plate LN optical control device in which a thin-plate LN optical waveguide element is accommodated in a housing, in which an atmosphere inside thereof is substituted with an inert gas that does not contain moisture, by using an air-tight sealing structure. In addition, another object of the invention is to provide a thin-plate LN optical control device in which drive voltage is low, an optical bandwidth is broad, reliability is high, and mass productivity is excellent.

To accomplish the objects, a thin-plate LN optical control device of the invention has the following technical characteristics.

(1) According to an aspect of the invention, there is provided thin-plate LN optical control device including: a thin-plate LN optical waveguide element which includes an optical waveguide formed by thermal diffusion of Ti, and a control electrode configured to control a light wave propagating through the optical waveguide in a substrate made of lithium niobate, and in which at least a part of the substrate is thinned; and a housing that accommodates the thin-plate LN optical waveguide element in an air-tight sealing manner. Oxygen is contained in a filler gas inside the housing.

(2) In the thin-plate LN optical control device according to (1), a molar concentration of oxygen in the filler gas may be 3% or greater.

(3) In the thin-plate LN optical control device according to (1) or (2), in the thin-plate LN optical waveguide element, the thickness of the substrate may be 10 µm or less.

(4) In the thin-plate LN optical control device according to (1) or (2), in the thin-plate LN optical waveguide element, a ridge may be formed in a front surface or a back surface of the substrate.

According to the aspect of the invention, in the thin-plate LN optical control device including: the thin-plate LN optical waveguide element which includes the optical waveguide formed by thermal diffusion of Ti in the LN substrate, and the control electrode that is formed on the substrate and is configured to control a light wave propagating through the optical waveguide, and in which at least a part of the substrate is thinned; and the housing that accommodates the thin-plate LN optical waveguide element in an air-tight sealing manner, since oxygen is contained in the filler gas inside the housing, it is possible to suppress an increase in DC drift amount. In addition, a variation between samples is small, and thus satisfactory reproducibility is obtained. As a result, it is possible to obtain a thin-plate LN optical control device excellent in mass productivity.

DETAILED DESCRIPTION OF THE INVENTION

Hereinafter, a thin-plate LN optical control device of the invention will be described in detail.

According to the invention, there is provided a thin-plate LN optical control device including: a thin-plate LN optical waveguide element which includes an optical waveguide formed by thermal diffusion of Ti and a control electrode configured to control a light wave propagating through the optical waveguide in a substrate made of lithium niobate, and in which at least a part of the substrate is thinned; and a housing that accommodates the thin-plate LN optical waveguide element in an air-tight sealing manner. Oxygen is contained in a filler gas inside the housing.

"Thinning" in the invention represents a state in which the thickness of at least a part of a substrate is made to be small by mechanical processing such as polishing and cutting. The "thinning" includes not only a state in which the entirety of the substrate is made to be thin but also a state in which a ridge is formed in a front surface or a back surface of the substrate. In a case where the thickness of a processed portion of the substrate is 30 µm or less and preferably 10 µm or less, the invention is effectively applied. In addition, in a case where a thinned portion of the substrate exists in the vicinity of the optical waveguide or at a site close to a substrate portion to which an electric field is applied by the control electrode, and in a case where a processing damage exists on a substrate surface that is exposed to an atmosphere, an effect of the invention is relatively high. In addition, even in a case of not performing a process of removing the processing damage, which remains on the substrate due to the mechanical processing, by chemicals or by thermal annealing, the invention is preferably applied.

The present inventors have made a thorough investigation. As a result, they obtained the following finding. In a thin-plate LN optical modulator, in a case where a behavior of DC drift is greatly different due to a filler gas inside the housing, and oxygen is contained in the filler gas, an increase in inter-control-electrode current value that is a parameter corresponding to a DC drift amount is suppressed, and thus a variation between samples decreases, and satisfactory reproducibility is obtained. In addition, with regard to the filler gas, it is preferable to use a gas that does not contain moisture from the viewpoint of preventing a decrease in adhesion of an adhesive, and disconnection or short-circuiting of an electric interconnection.

Figure 1:
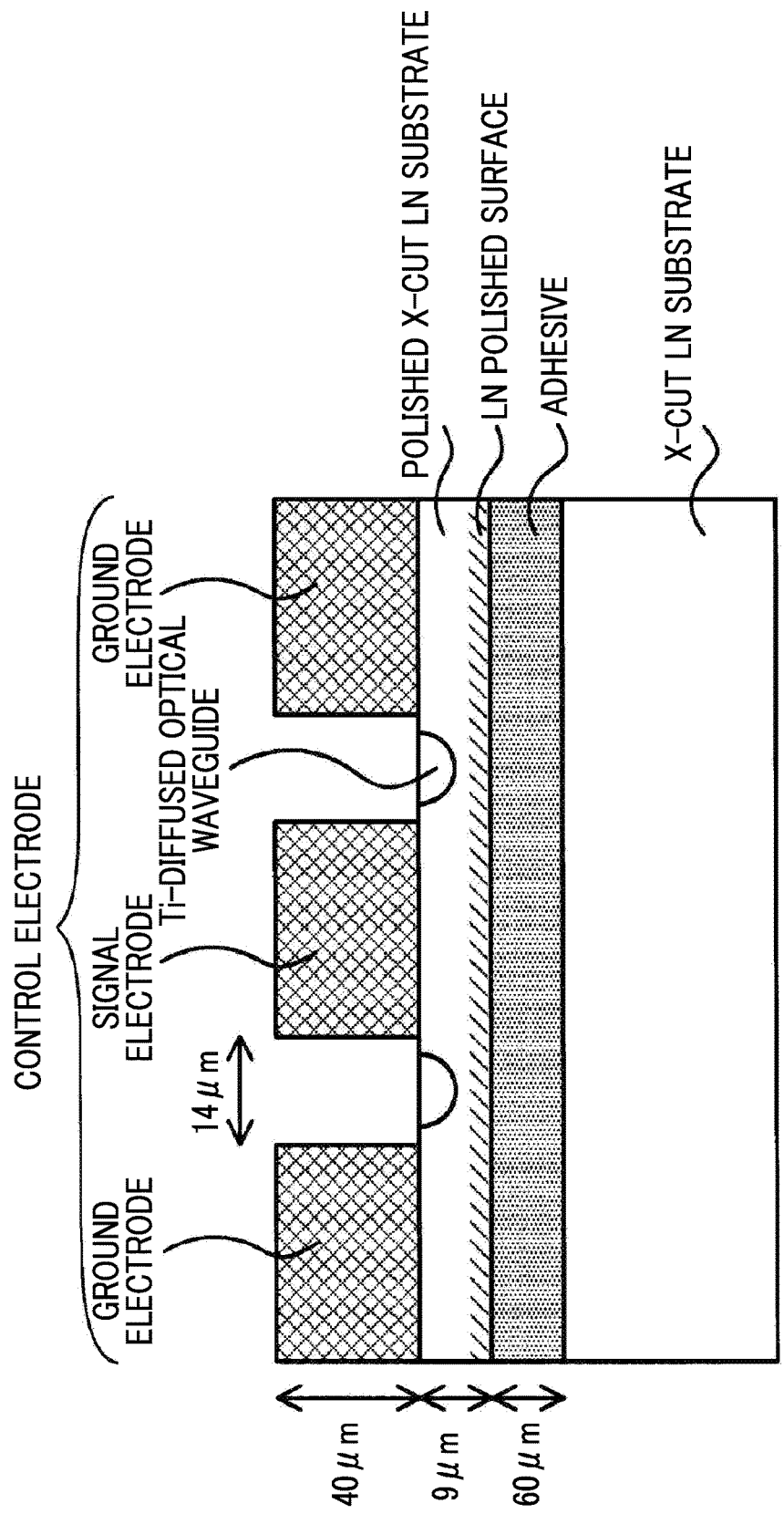
FIG. 1 is a cross-sectional view of a thin-plate LN optical waveguide element of a thin-plate LN optical modulator as one of thin-plate LN optical control devices.

First, the DC drift of the thin-plate LN optical modulator exhibits a behavior that is different in accordance with an atmosphere inside the housing. Accordingly, a thin-plate LN optical waveguide element having a cross-sectional shape as illustrated in FIG. 1 is prepared.

The thin-plate LN optical waveguide element is prepared as follows. First, a Ti film that is patterned in a Mach-Zehnder structure is formed on one surface of an X-cut LN substrate by using a photolithography technology. Then, the Ti film is thermally diffused in the LN substrate to form a Ti-diffused optical waveguide.

A surface (back surface) opposite to the surface, in which the Ti-diffused optical waveguide is formed, is polished so that the LN substrate has a small plate thickness of 9 µm. The LN substrate is adhered to an X-cut LN substrate having a thickness of 500 µm for reinforcement by using an adhesive.

Next, the control electrode that controls a light wave propagating through the Ti-diffused optical waveguide is formed as follows. As a sheet layer, Ti and Au films are formed on the surface, in which the Ti-diffused optical waveguide is formed, in this order by a vacuum vapor deposition method. When forming the control electrode, a semi-additive method and electrolysis gold plating are used.

With regard to the control electrode, a coplanar structure is used. A signal electrode (an electrode at the center in FIG. 1) is formed between arms of the Ti-diffused optical waveguide having the Mach-Zehnder structure, and a ground electrode is formed on an outer side of the arms. A gap between the signal electrode and the ground electrode is set to 14 µm. In addition, in the control electrode, a length (in a direction perpendicular to a paper surface in the drawing) of a portion that controls a light wave propagating through the Ti-diffused optical waveguide is set to 10 mm. The thickness of the control electrode is set to 40 µm. Then, the resultant body is cut into chips.

The thin-plate LN optical waveguide element is fixed to the inside of a stainless metal housing through an adhesive to be accommodated therein, and an optical fiber is coupled to an optical waveguide end on both end surfaces of the thin-plate LN optical waveguide element by using butt joint. The housing is provided with a structure capable of realizing introduction and substitution of a gas. Specifically, a gas joint is provided in a lateral surface of the housing. The housing, in which the thin-plate LN optical waveguide element is accommodated, is sealed by seam-welding a lid thereto. Furthermore, a structure and a method, which are capable of realizing sealing, are also used an introduction portion of the optical fiber into the housing.

A DC voltage in which an initial control voltage is set to 3.5 V is applied to the control electrode of the thin-plate LN optical modulator in which the thin-plate LN optical waveguide element illustrated in FIG. 1 is accommodated in the housing at a test environment temperature of 85° C., and a temporal variation of the control voltage is measured.

Figure 2:
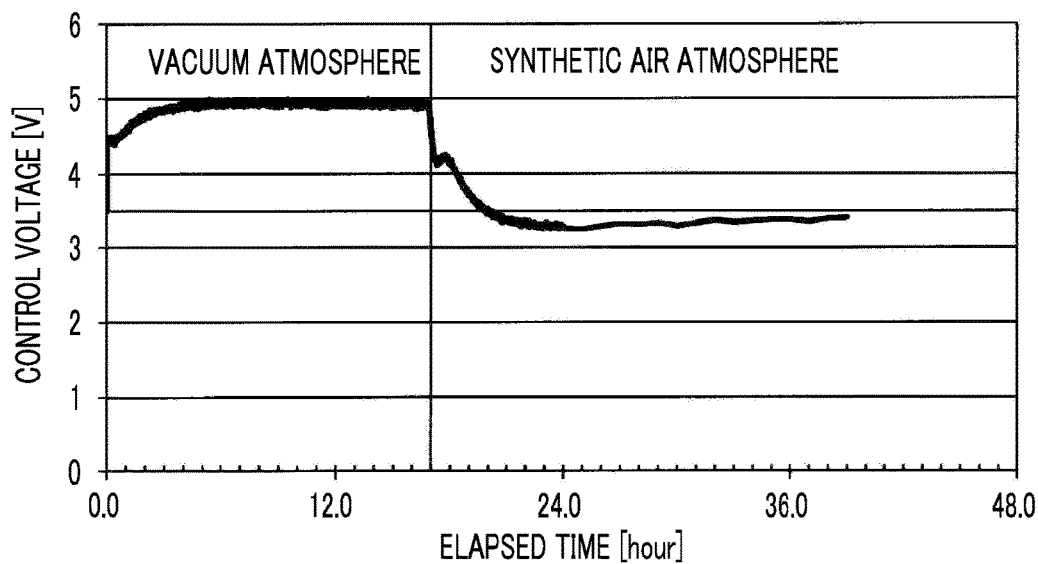
FIG. 2 is a graph illustrating a temporal variation of a DC drift amount in a thin-plate LN optical modulator in which the thin-plate LN optical waveguide element illustrated in FIG. 1 is accommodated in a housing by using an air-tight sealing structure in a case where an atmosphere inside the housing is switched from vacuum into air.

An atmosphere inside the housing is set to vacuum from initiation of measurement to 17 hours, and the vacuum atmosphere is substituted with a synthetic air (oxygen: 20%, nitrogen: 80%) that does not contain moisture. FIG. 2 is a graph illustrating a temporal variation of the control voltage of the thin-plate LN optical modulator in the above-described atmosphere.

From the graph in FIG. 2, it can be seen that the control voltage varies in a positive direction from 3.5 V to approximately 5.0 V when the atmosphere inside the housing is vacuum, and the control voltage rapidly varies in a negative direction immediately after the atmosphere inside the housing is substituted with dry air. This variation represents that DC drift of the thin-plate LN optical modulator is strongly affected by the atmosphere inside the housing.

The reason of atmosphere dependency of the DC drift of the thin-plate LN optical modulator is assumed to be because electrical resistance between the signal electrode and the ground electrode varies with the elapse of time due to an atmosphere exposed to an LN substrate surface on which the control electrode is formed, and a variation (an absolute value of resistance or a time constant of variation with the elapse of time) at this time is different. Accordingly, for easiness of measurement, measurement of an inter-control-electrode current (current that flows between control electrodes (the signal electrode and the ground electrode) with the optical waveguide interposed therebetween) is performed instead of measurement of a temporal variation of the control voltage of the thin-plate LN optical modulator.

First, a temporal variation of the inter-control-electrode current is measured by using the thin-plate LN optical modulator with respect to a case where the atmosphere inside the housing is set to nitrogen that does not contain moisture and a case where the atmosphere is set to air (synthetic air) that does not contain moisture. A test environment temperature is set to 85° C., and a voltage that is applied between control electrodes is set to 100 V. The number of times of measurement in the nitrogen atmosphere is set to 12, and the number of times of measurement in the synthetic air atmosphere is set to 5.

Figure 3:
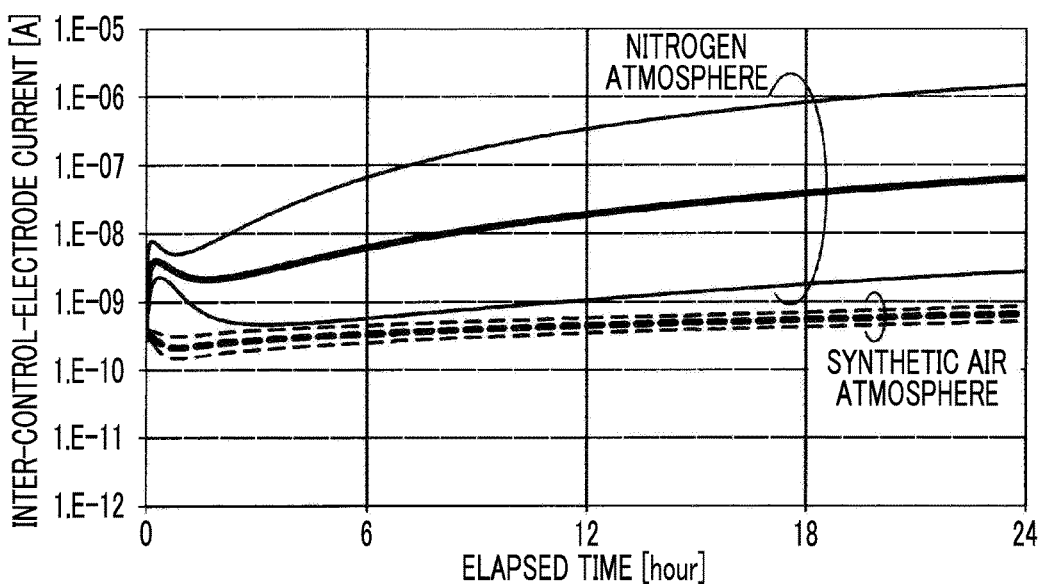
FIG. 3 is a graph illustrating a temporal variation of an inter-control-electrode current in a thin-plate LN optical modulator in which the thin-plate LN optical waveguide element illustrated in FIG. 1 is accommodated in a housing by using an air-tight sealing structure in a case where an atmosphere inside the housing is set to a nitrogen atmosphere that does not contain moisture, and an air atmosphere that does not contain moisture.

FIG. 3 is a graph illustrating a temporal variation of the inter-control-electrode current of the thin-plate LN optical modulator in the above-described atmosphere. In FIG. 3, a solid line represents a temporal variation of the inter-control-electrode current in a nitrogen atmosphere, a bold line represents an average value, and fine lines on upper and lower sides represent "average value+standard deviation (upper line) and "average value−standard deviation (lower line). In addition, in FIG. 3, dotted lines represent a temporal variation of the inter-control-electrode current in the synthetic air atmosphere, and a bold line and fine lines in the dotted lines represent the same things as in the nitrogen atmosphere.

From the graph in FIG. 3, it can be seen that the inter-control-electrode current in the synthetic air atmosphere is smaller and a variation in the synthetic air atmosphere is smaller in comparison to the nitrogen atmosphere.

As the conclusion for the dependency of the temporal variation of the inter-control-electrode current on the atmosphere, it can be assumed that an increase in the DC drift amount and a variation thereof the nitrogen atmosphere are larger in comparison to the synthetic air atmosphere.

Figure 4A:
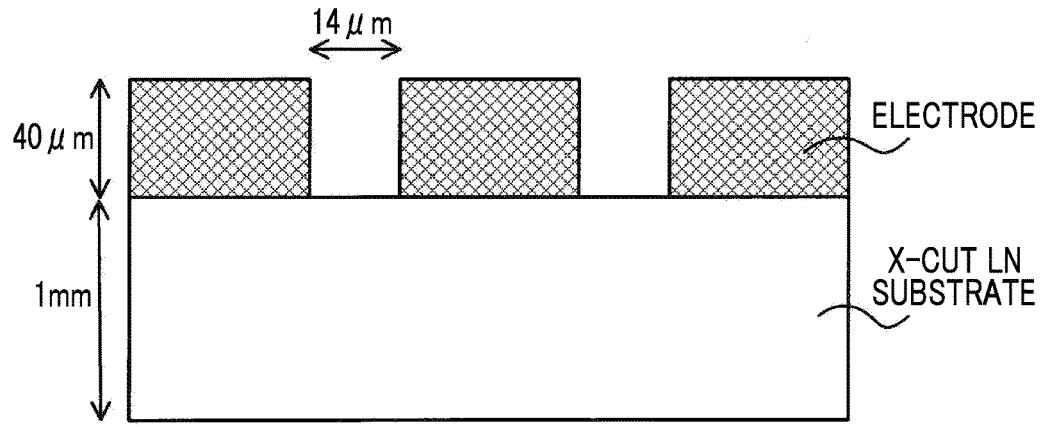
FIG. 4A is a view illustrating a cross-sectional structure of Test Specimen 1 that is used to specify the cause for occurrence of the temporal variation of the inter-control-electrode current.
Figure 4B:
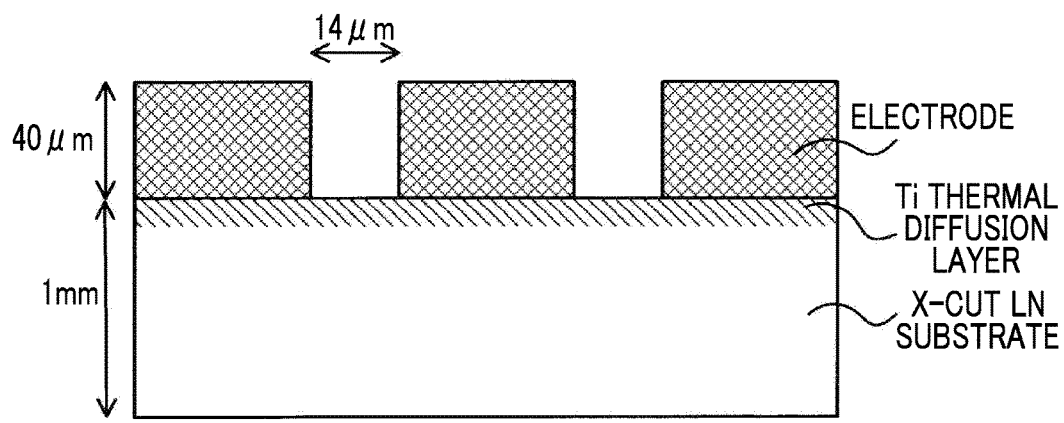
FIG. 4B is a view illustrating a cross-sectional structure of Test Specimen 2 (subjected to Ti thermal diffusion treatment) that is used to specify the cause for occurrence of the temporal variation of the inter-control-electrode current.
Figure 4C:
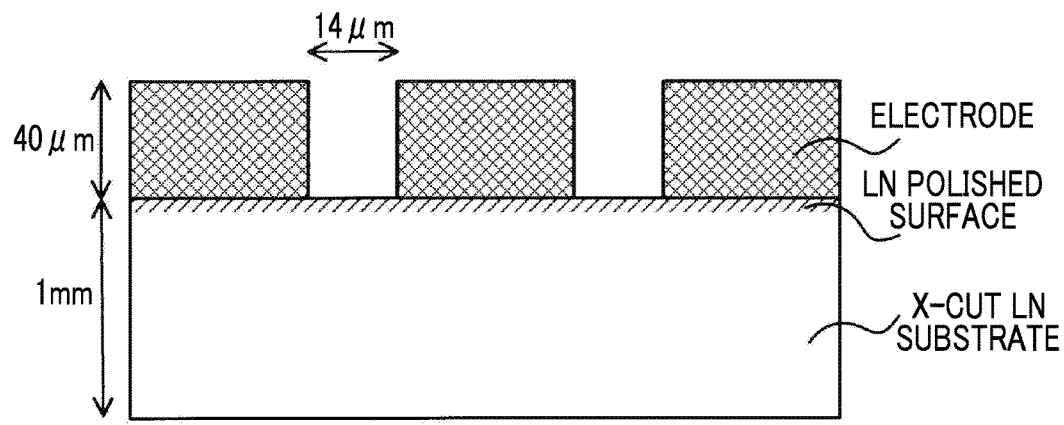
FIG. 4C is a view illustrating a cross-sectional structure of Test Specimen 3 (subjected to a polishing treatment) that is used to specify the cause for occurrence of the temporal variation of the inter-control-electrode current.

Next, three kinds of test specimens illustrated in FIG. 4A to FIG. 4C are prepared to analyze the cause for dependency of the inter-control-electrode current on the atmosphere, and a temporal variation of an inter-electrode current (current that flows between electrodes of test specimens in which the optical waveguide is not formed) is measured under the same atmosphere inside the housing and the same measurement conditions as those for obtaining the results in FIG. 3.

In Test Specimen 1 in FIG. 4A, electrodes having the same structure as in FIG. 1 are formed in an X-cut LN substrate having a thickness of 1 mm.

In Test Specimen 2 in FIG. 4B, a Ti film having a thickness of 100 nm is formed on one surface of an X-cut LN substrate having a thickness of 1 mm and is subjected to thermal diffusion, and the same electrode structure as in Test Specimen 1 is formed.

In Test Specimen 3 in FIG. 4C, one surface of an X-cut LN substrate having a thickness of 1 mm is polished by the method of polishing the back surface in FIG. 1, and the same electrode structure as in Test Specimen 1 is formed on a surface of the polished LN substrate.

Figure 5:
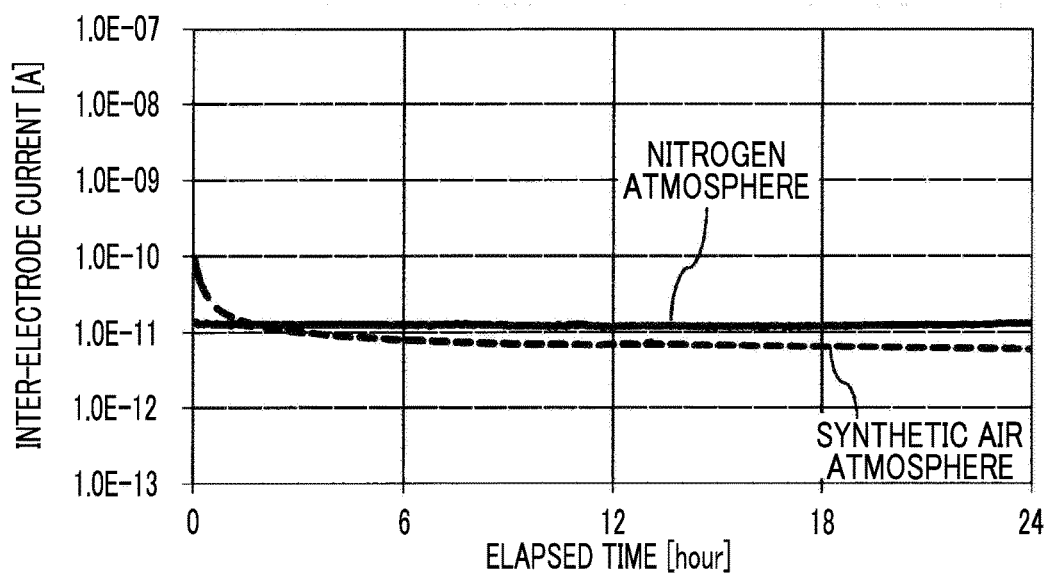
FIG. 5 is a graph illustrating the temporal variation of the inter-electrode current in Test Specimen 1 illustrated in FIG. 4A in a case of a nitrogen atmosphere that does not contain moisture and in a case of an air atmosphere that does not contain moisture.
Figure 6:
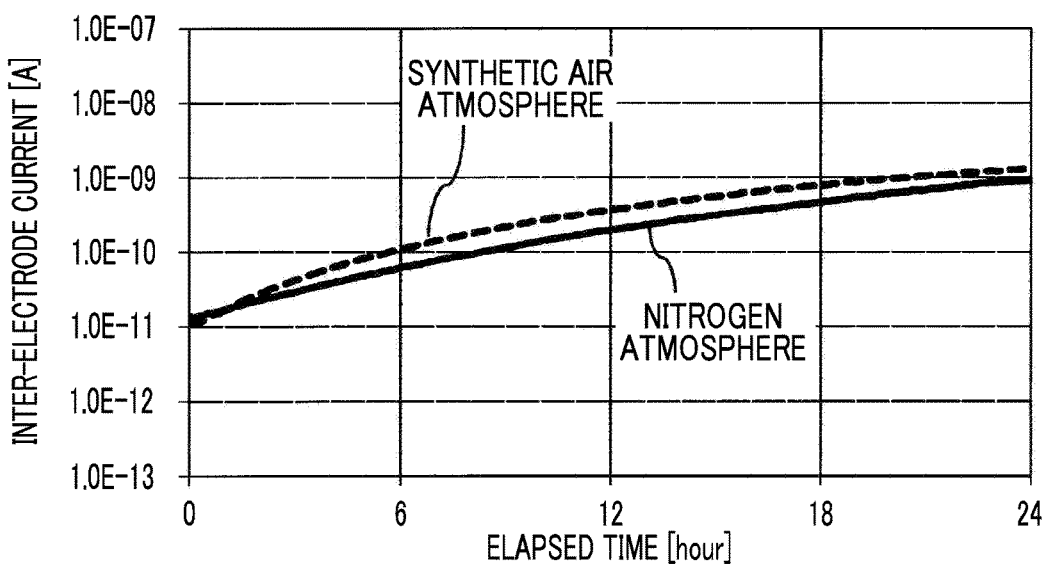
FIG. 6 is a graph illustrating the temporal variation of the inter-electrode current in Test Specimen 2 illustrated in FIG. 4B in a case of a nitrogen atmosphere that does not contain moisture and in a case of an air atmosphere that does not contain moisture.
Figure 7:
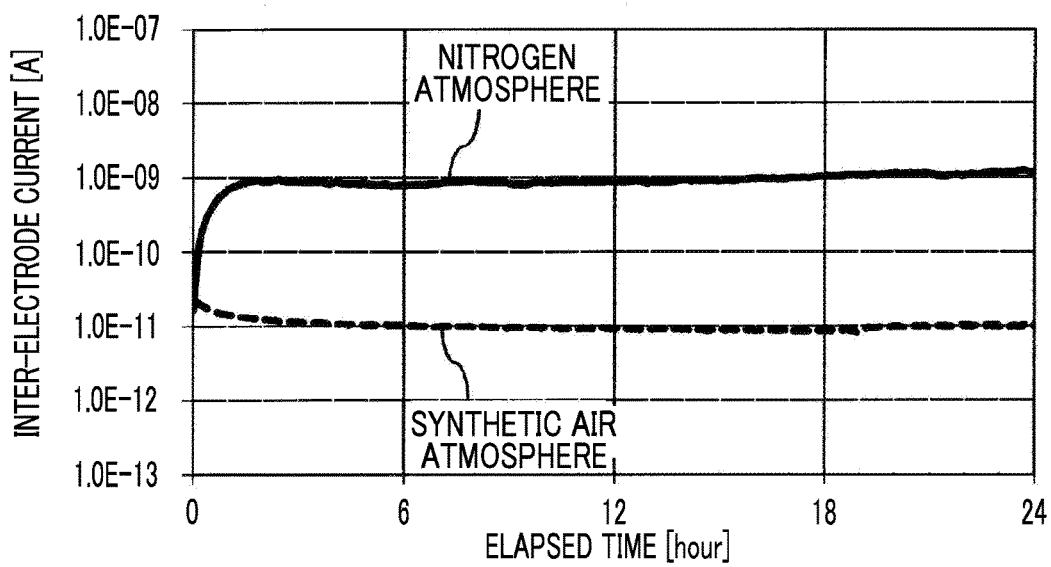
FIG. 7 is a graph illustrating the temporal variation of the inter-electrode current in Test Specimen 3 illustrated in FIG. 4C in a case of a nitrogen atmosphere that does not contain moisture and in a case of an air atmosphere that does not contain moisture.

FIG. 5 to FIG. 7 are views illustrating a temporal variation of an inter-electrode current in a case where an atmosphere inside housings of Test Specimen 1, Test Specimen 2, and Test Specimen 3 is set to a nitrogen atmosphere that does not contain moisture, and in a case where the atmosphere is set to synthetic air that does not contain moisture.

From the graph in FIG. 5, it can be seen that the inter-electrode current slightly fluctuates immediately after initiation of test, but a variation stops after the fluctuation, and an approximately constant state is maintained. In addition, a difference in the inter-electrode current due to an atmosphere is hardly shown.

From the graph in FIG. 6, it can be seen that the inter-electrode current gradually increases with the elapse of time. A temporal variation of the inter-electrode current is different from that of Test Specimen 1, but a difference in the inter-electrode current due to an atmosphere is not shown.

From the graph in FIG. 7, it can be seen that the inter-electrode current rapidly increases immediately after initiation of test in a case of the nitrogen atmosphere, and the variation becomes constant after the increase. In contrast, in a case of the synthetic air atmosphere, it can be seen that the inter-electrode current gradually decreases immediately after initiation of test, and the variation becomes constant after the decrease. In addition, an inter-electrode current value at elapsed time, at which the variation of the inter-electrode current value becomes constant, is greater in the nitrogen atmosphere in comparison to the air atmosphere. In addition, in the air atmosphere, it can be seen that the inter-electrode current value becomes approximately the same as the inter-electrode current value in Test Specimen 1.

From the results, even in the thin-plate LN optical waveguide element that is subjected to polishing, it is assumed that the DC drift amount is likely to increase in the nitrogen atmosphere, and the DC drift amount is likely to decrease in the synthetic air atmosphere.

The inherent cause for the variation in the behavior of the DC drift and the inter-control-electrode current due to the atmosphere inside the housing is not specified at this time. However, it is assumed that a band structure of an LN substrate surface varies due to a polishing damage that occurs in the vicinity of the LN substrate surface by a polishing treatment.

In a case where the variation of the band structure is unevenly distributed on the LN substrate surface, it is considered that a variation of a band gap, a non-uniform spatial charge, or a defect level is caused to occur, and thus the inter-control-electrode current value is influenced. In addition, in a case where the LN substrate surface on which the polishing damage exists is exposed to an atmosphere including oxygen, it is assumed that oxygen or an oxygen ion is adsorbed to the spatial charge or the defect level, thereby compensating a band structure that has varied.

In Test Specimen 3 in FIG. 4C, a polished surface is exposed to an atmosphere inside the housing. On the other hand, in the thin-plate LN optical waveguide element in FIG. 1, a polished surface (back surface of the LN substrate) is not exposed to an atmosphere inside the housing due to an adhesive layer, and thus it is considered that the behavior of the DC drift and the inter-control-electrode current do not depend on the atmosphere.

However, as illustrated in FIG. 2, a temporal variation of an operation point depends on the atmosphere. The cause for the dependency is assumed to be because a polishing damage occurred on the back surface of the LN substrate due to polishing reaches the vicinity of a surface (front surface), in which the optical waveguide is formed, of the LN substrate.

Next, the following two tests are performed by using Test Specimen 3 with focus given to oxygen, which is a component of the filler gas, from measurement results of FIG. 3, and FIG. 5 to FIG. 7.

First, a first test is a test of measuring a temporal variation of an inter-electrode current due to a difference in a filler gas at a test temperature of 85° C. in a state in which a DC voltage of 100 V is applied between electrodes of Test Specimen 3.

Figure 8:
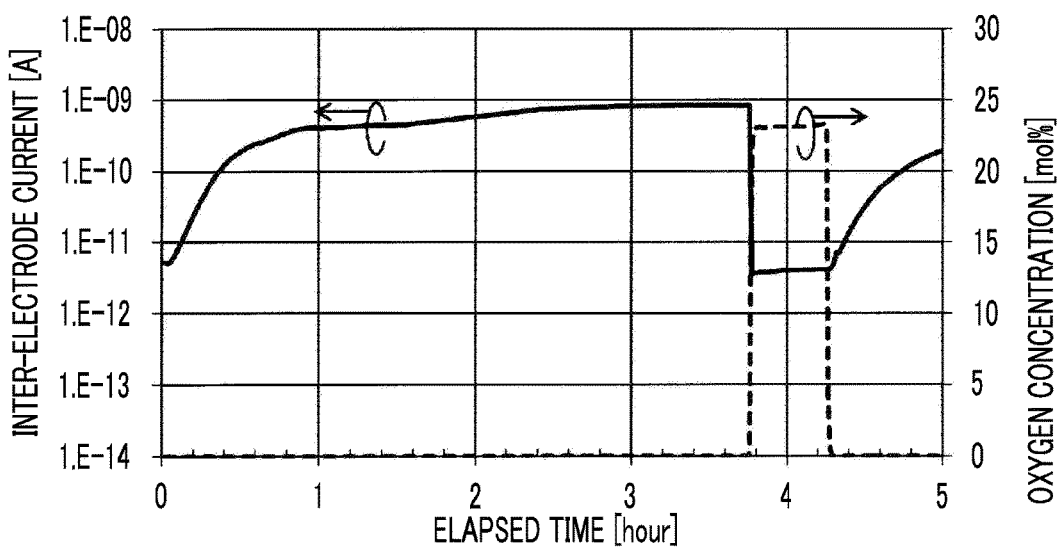
FIG. 8 is a graph illustrating the temporal variation of the inter-electrode current in Test Specimen 3 illustrated in FIG. 4C in a nitrogen atmosphere that does not contain moisture in a case of introducing oxygen not containing moisture on the way.

The filler gas is set to nitrogen at first, and oxygen is introduced (an oxygen molar concentration: 23%) on the way. Then, the filler gas is substituted with nitrogen. FIG. 8 is a graph illustrating the measurement result.

As can be seen from FIG. 8, in the nitrogen atmosphere at first, as is the case with a result in a nitrogen atmosphere in FIG. 7, it can be seen that an inter-electrode current increases, and it enters a normal state. It can be seen that the inter-electrode current decreases when oxygen is subsequently introduced, and the inter-electrode current increases when the atmosphere is substituted with nitrogen.

From the test results, it can be seen that the inter-electrode current decreases due to oxygen.

Accordingly, in the subsequent test, an investigation has been made with respect to the dependency of the inter-electrode current value on the oxygen molar concentration. The test is a test of measuring the inter-electrode current value at a test temperature of 85° C., in a state in which a DC voltage of 100 V is applied between electrodes, and in an atmosphere of another oxygen molar concentration as test conditions. Measurement of the inter-electrode current value is measured after elapse of three hours at which an inter-electrode current becomes approximately the constant value from initiation of voltage application.

Figure 9:
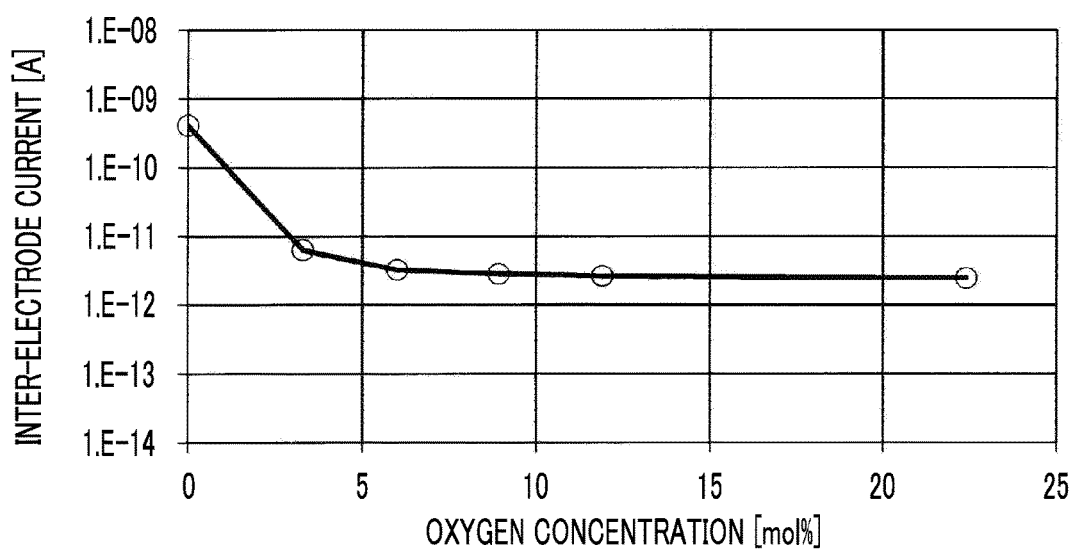
FIG. 9 is a graph illustrating an inter-electrode current value with respect to a molar concentration of oxygen that does not contain moisture in Test Specimen 3 illustrated in FIG. 4C.

FIG. 9 is a graph illustrating the result. From FIG. 9, it can be seen that as the oxygen molar concentration increases, the inter-electrode current value decreases. In addition, it can be seen that at an oxygen molar concentration of 3%, the inter-electrode current becomes $10^{-11}$ (A) or less, and particularly, at an oxygen concentration of 5% or greater, the inter-electrode current becomes approximately constant value regardless of the oxygen molar concentration.

As described above, in a structure in which the thin-plate LN optical waveguide element, which is obtained by thinning the LN optical waveguide element including the optical waveguide formed by thermal diffusion of Ti in the substrate that uses LN, and the control electrode that is formed in the substrate and is configured to control a light wave propagating the optical waveguide, is accommodated in the housing in an air-tight sealing manner, it can be seen that when oxygen is contained in the filler gas inside the housing, it is possible to effectively suppress the DC drift.

Particularly, in a case where the thickness of the thin-plate LN optical waveguide element is made to be small to approximately 10 μm by polishing, the effect of suppressing the DC drift due to oxygen becomes significant. In the above-described tests, description has been made with focus given to the polishing as mechanical processing. However, even in plasma etching, sandblasting, and the like when removing the vicinity of both sides of the optical waveguide so as to allow the Ti-diffused optical waveguide formed in the LN substrate to have a ridge structure, it is assumed that a damage occurs on the LN substrate surface in the same manner, and thus it is possible to expect suppression of the DC drift due to oxygen.

In addition, as can be seen from FIG. 6, it is assumed that the DC drift amount increases when considering that the inter-electrode current value in a case where Ti is thermally diffused increases from $10^{-11}$ (A) with the elapse of voltage application time. Accordingly, in a case where mechanical processing is additionally performed with respect to an LN optical waveguide element in which an optical waveguide is formed by thermal diffusion of Ti, when the invention is applied to the LN optical waveguide element, it is possible to expect suppression of the DC drift.

In the examples, description has been given of the thin-plate LN optical modulator as an example of a thin-plate LN optical control device. However, it is needless to say that the invention suppresses a DC drift amount, for example, in a directional coupler or a thin-plate LN optical switch using a Y-branched structure.

As described above, according to the invention, it is possible to provide a thin-plate LN optical control device in which occurrence of DC drift is suppressed and mass productivity is excellent.

What is claimed is:

1. A thin-plate LN optical control device comprising:
  a thin-plate LN optical waveguide element which includes an optical waveguide formed by thermal diffusion of Ti, and a control electrode configured to control a light wave propagating through the optical waveguide in a substrate made of lithium niobate, and in which at least a part of the substrate is thinned; and
  a housing that accommodates the thin-plate LN optical waveguide element in an air-tight sealing manner,
  wherein the substrate is thinned by mechanical processing, the thickness of the substrate is 10 μm or less, and oxygen is contained in a filler gas inside the housing.

2. The thin-plate LN optical control device according to claim 1, wherein a molar concentration of oxygen in the filler gas is 3% or greater.

3. The thin-plate LN optical control device according to claim 1, wherein in the thin-plate LN optical waveguide element, a ridge is formed in a front surface or a back surface of the substrate.

4. The thin-plate LN optical control device according to claim 1, wherein the filler gas does not container moisture.

* * * * *